Patented July 5, 1927.

1,634,969

UNITED STATES PATENT OFFICE.

JAMES G. E. WRIGHT, OF ALPLAUS, NEW YORK, AND WILLARD J. BARTLETT, OF EAST CLEVELAND, OHIO, ASSIGNORS TO GENERAL ELECTRIC COMPANY, A CORPORATION OF NEW YORK.

ESTER-RESIN COMPOSITION AND METHOD OF PREPARATION.

No Drawing.   Application filed June 13, 1924.   Serial No. 719,825.

The present invention relates to the class of resinous condensation compounds which are complex esters produced by the interaction of a polyhydric alcohol, such as glycerine, with a polybasic acid, such as phthalic acid, or its anhydride.

As described in Callahan Patents 1,108,329 and 1,108,330, the phthalic resin, which has become known as "glyptal" may be prepared from glycerine and phthalic anhydride as a brittle, transparent mass, of a slightly yellowish tint which is fusible, and is soluble in acetone. This fusible resin, which is sometimes called the A-stage resin, is convertible by heating to a temperature of about 190° to 210° C. (the lower temperature requiring the longer time) to a substantially infusible, insoluble resin, known as the B-stage resin. This resin swells with acetone but does not dissolve in ordinary sense. The conversion of the A-stage resin to the B-stage resin is accompanied by the evolution of water. Continued heating of the B-stage resin will harden and toughen the resin and render it inert even to acetone, the final product being known as the C-stage resin.

As this conversion of the initial, fusible, soluble resin to its most stable, hard, tough condition requires considerable time and fairly high temperatures, it is desirable for some technical purposes to carry the condensation of the resin to a point just short of the B-stage, and then to cure the resin by a short heating in its final application as a cement, as a binder, or varnish or whatever its use may be. When the resin is heated in a mass, it is difficult to interrupt the hardening at a point close to the B-stage. Apparently, in a mass the reaction proceeds at an accelerated rate, and the resin is apt to go over to the B-stage or even final C-stage form, due to the difficulty of suddenly lowering the temperature.

We have discovered that when a resin of the ester type, such as glyptal, is dispersed in a medium capable of being heated to a temperature high enough to complete the reaction between the polyhydric alcohol and the polybasic acid, that the hardening of the dispersed resin may be carried very close to the B-stage and may then be interrupted by precipitating the resin. The resin after this treatment may be utilized, either alone or mixed with fillers, as a cement, as a molding mixture, as an enamel or for other purposes.

The term "dispersion" is used herein in the broad sense understood by chemists to include in general the distribution of a solid in a state of fine subdivision in a fluid medium. Solution is one form of dispersion.

In carrying out our invention, a resinous condensation product, of which glyptal is a specific example, is dissolved in a high boiling point solvent, such for example, as di-ethyl phthalate or benzyl benzoate. As di-ethyl phthalate boils at about 295° C. the solution may be heated to a temperature sufficiently high to cure the resin rapidly, say from about 210° C. to about 290° C. without special provision to prevent excessive loss of solvent. The evaporated solvent may be recovered by condensation but a reflux condenser cannot be used as provision must be made for the escape of volatile matter.

The condensation process proceeds in solution with loss of some phthalic anhydride and the elimination of water.

After heating in solution for a length of time depending on the initial condition of the resin and the temperature, which is easily determined by experiment, the heating is discontinued and the resin is precipitated from the solution. For example, the di-ethyl phthalate solution may be poured into benzol, thereby precipitating the glyptal as a white curd. After drying, the resin may be ground to a powder.

This partially hardened resin is slowly soluble in acetone. Unlike ordinary glyptal it is non-corrosive to metals. This resin may be readily converted to the final, hard, stable condition, with or without admixture with fillers, by heating to a moderately high temperature, say to about 180° C. for a very much shorter time than required to harden glyptal which has not been subjected to the described treatment. It gives off no phthalic anhydride distillate during curing and sets in a shorter time than ordinary glyptal to form the hard, tough mass characteristic of the resin in its final C-stage. This rapid hardening and chemical inertness of the resin prepared in accordance with our invention are properties entailing important technical advantages in the manufacture of cemented, coated or molded products. In the manufacture of electrical apparatus, the non-corrosive property of the resin is particularly advantageous.

What we claim as new and desire to secure by Letters Patent of the United States, is:

1. The method of treating a resin comprising a compound of glycerine and a polybasic acid in the fusible stage which consists in dispersing said resin in an inert fluid medium and heating the resulting dispersion to a sufficiently high temperature to partially condense said resin and then separating the resin from said medium.

2. The method of treating a resin, comprising a compound of glycerine and phthalic anhydride, and being in the soluble or fusible stage, which consists in dispersing said resin in a liquid which is capable of being heated to a temperature sufficiently high to partially condense said resin and which is chemically inactive with respect to said resin, heating said liquid and resin to a temperature of condensation and precipitating said resin from solution before the condensation is complete.

3. The method of treating a compound of a polyhydric alcohol and a polybasic acid, containing some of said acid in a volatilizable state, which consists in dissolving said compound in a solvent having a boiling point as high as the temperature at which volatilization of said acid proceeds actively and heating said solution under conditions favorable to the escape of volatilizable material.

4. The method of treating a resin of the polyhydric alcohol-organic acid type which consists in dispersing said resin in a solvent and heating the dispersed resin to a temperature sufficiently high to cause said resin to become partially condensed and precipitating the resin from said solution and thereafter completing the condensation of said resin.

5. The method of curing of a resinous condensation product of glycerine and phthalic anhydride in the fusible, soluble-stage without carying the resin into the infusible, insoluble-stage which consists in dissolving said resin in a fluid medium, heating to a temperature sufficiently high to cause volatilizable acid constituents and water to be eliminated, and precipitating said product from said solvent.

6. The method of treating a compound of glycerine and phthalic anhydride in the fusible state preliminary to final conversion to the infusible state which consists in dissolving said resin in di-ethyl-phthalate, heating said solution to about 210° to 290° C. and then precipitating said resin from solution.

7. The method of treating a polyhydric alcohol-polybasic acid resin which consists in dispersing said resin in a liquid which is inert with respect to said resin, heating said composition to a temperature sufficiently high to carry forward the condensation of said resin, separating the resin from said liquid before condensation has become complete and finally completing the condensation of said resin in the absence of said liquid.

In witness whereof, the said JAMES G. E. WRIGHT has hereunto set his hand this 9th day of June, 1924, and the said WILLARD J. BARTLETT has hereunto set his hand this 10th day of June, 1924.

JAMES G. E. WRIGHT.
WILLARD J. BARTLETT.